United States Patent [19]

Katsura et al.

[11] Patent Number: 4,909,705
[45] Date of Patent: Mar. 20, 1990

[54] MULTI-STAGE DIFFUSE-TYPE CENTRIFUGAL PUMP

[75] Inventors: Hiroyuki Katsura; Akihisa Okada, both of Ibaraki, Japan

[73] Assignee: Hitachi, Ltd., Tokyo, Japan

[21] Appl. No.: 283,963

[22] Filed: Dec. 13, 1988

[30] Foreign Application Priority Data

Dec. 18, 1987 [JP] Japan .................. 62-318881

[51] Int. Cl.[4] ............................................ F04D 29/08
[52] U.S. Cl. .......................... 415/170.1; 415/214.1; 415/199.1; 277/189.5
[58] Field of Search ............... 415/199.1, 199.2, 199.3, 415/170.1, 174.2, 901; 92/226; 277/189.5

[56] References Cited

U.S. PATENT DOCUMENTS

| | | | |
|---|---|---|---|
| 2,693,760 | 11/1954 | Miller | 415/501 X |
| 3,115,840 | 12/1963 | Feltus | 415/199.3 |
| 4,128,250 | 12/1978 | Barth | 277/189.5 |
| 4,483,660 | 11/1984 | Roberts | 415/199.1 X |

FOREIGN PATENT DOCUMENTS

| | | | |
|---|---|---|---|
| 1029676 | 5/1958 | Fed. Rep. of Germany | ... 415/199.2 |
| 58-167895 | 10/1983 | Japan . | |
| 58-183892 | 10/1983 | Japan . | |
| 539373 | 9/1941 | United Kingdom | ............... 415/501 |
| 580753 | 9/1946 | United Kingdom | ................ 92/226 |

Primary Examiner—Robert E. Garrett
Assistant Examiner—John T. Kwon
Attorney, Agent, or Firm—Antonelli, Terry & Wands

[57] ABSTRACT

A multi-stage diffuser-type centrifugal pump suitable for feeding under pressure a low-temperature fluid such as a liquefied gas. Stages are respectively provided between adjacent ones of impellers provided in a plurality of stages. A cylindrical stage casing is provided in such a manner as to surround the stages, a sealant is provided between each stage and the stage casing to form a channel flow on an inner peripheral surface of the stage casing for flow from an upstream-side impeller to a downstream-side impeller. In addition, the sealant has a coefficient of thermal expansion which differs from the coefficient of thermal expansion of the stage and the stage casing.

17 Claims, 5 Drawing Sheets

MULTI-STAGE DIFFUSE-TYPE CENTRIFUGAL PUMP

BACKGROUND OF THE INVENTION

The present invention relates to a multi-stage diffuser-type centrifugal pump, and, more particularly, to a multi-stage diffuser-type centrifugal pump suitable for supplying under pressure a low-temperature fluid such as, for example a liquified gas.

Conventionally, as disclosed in, for example "Submerged Motor Pump for Cryogenic Plants" HITACHI REVIEW, Vol. 32 (1983) No. 1 and Japanese Patent Laid Open No. 183892/1983 a pump of the aforementioned type is disposed in a suction pot with the arrangement being such that the pressure of a fluid flowing from a suction pipe into the suction pot is increased by impellers disposed in a plurality of stages driven by a motor section, and the fluid passes through a discharge communicating passage and is discharged from a discharge pipe.

The diffuser has a diffuser vane and a return vane and is accommodated in a stage with the stage including a flat plate section for holding the stage in the axial direction and an outer barrel section forming a pressure boundary with the outside of the pump.

In the above-described construction, each stage is clamped by a suction casing and a motor casing and is tightened by a plurality of tightening bolts with as to be sealed from the outside of the pump, so uniform and large tightening forces being required for the tightening bolts. Thus, considerable experience and skill is required in tightening operation since, should the tightening bolts be unevenly tightened, the stages are fixed in a bent state, so that gaps are provided at the respective joint surfaces of the outer barrel sections of the stages thereby resulting in an increase in the amount of liquid that leaks to outside the pump under pressure causing the pump efficiency to decline. If the amount of uneven tightening is considerably large, fixing members for the stages and diffusers, and the axes of rotary bodies including the shaft and the impellers, do not align with each other, thereby resulting in accidental contacting of the component during operation of the pump. For this reason, it has been necessary to carefully tighten the tightening bolts. Additionally, since the tightening bolts are arranged with intervals provided therebetween in the direction the outer periphery of the stage, another disadvantage resides in the fact that the outside diameters and thicknesses of the suction casing and the motor casing become large. Furthermore, a large suction casing for accommodating a pump has also been required. Accordingly, there has been a problem in that the pump tends to become large in size and heavy in weight.

Japanese Patent Laid-Open No. 167895/1983 another an apparatus wherein sectional type stages, sectional type diffusers, and impellers are accommodated in the state of stages in a cylindrical barrel, and the diffusers, stages, and the barrel are formed of materials having different coefficients of thermal expansion, e.g., austenitic stainless steel and an aluminum alloy to ensure that the outer peripheral surface of each stage and the inner peripheral surface of the barrel are brought into close contact with each other by making use of the difference in the coefficients of thermal expansion.

With such a prior art, the diffusers, the stages and the barrel must be fabricated with metals having different coefficients of thermal expansion, so that fabrication is troublesome, and, since either the diffusers and the stages or the barrel are fabricated with a metal having a greater coefficient of thermal coefficient, it is very difficult to obtain sufficient strength, making it impossible to fabricate a multi-stage diffuser-type centrifugal pump having high strength.

SUMMARY OF THE INVENTION

Accordingly, an object of the present invention is to provide a compact and lightweight multi-stage diffuser-type centrifugal pump which facilitates assembly and disassembly thereof, thereby overcoming the above-described drawbacks and disadvantages encountered in the prior art.

Another object of the present invention is to provide a multi-stage diffuser-type centrifugal pump which is easy to fabricate and is provided with high strength.

According to advantageous feature of the present invention there is provided a multi-stage diffuser-type centrifugal pump comprising a stage casing, a rotary shaft provided in the stage casing and driving means for driving the rotary shaft, with impellers being provided on the rotary shaft in a plurality of stages. The stages are respectively disposed between adjacent ones of the impellers to form a flow channel between the same and an inner peripheral surface of the stage casing, and sealing means are provided around each of the stages for providing a seal between outer peripheral portions of the stages and the inner peripheral surface of the stage casing, with the sealing means being formed of a material whose coefficient of thermal expansion differs from the coefficient of thermal expansion of the stages and the stage casing.

According to further features of the present invention there is provided a multi-stage diffuser-type centrifugal pump comprising: a suction pot; a stage casing disposed inside the suction pot to from a flow channel, a rotary shaft provided in the stage casing, and driving means for driving the rotary shaft, impellers provided on the rotary shaft in a plurality of stages. The stages are respectively disposed between adjacent ones of the impellers to form the channel of flow from an upstream-side impeller to a downstream-side impeller between the same, and an inner peripheral surface of the stage casing, and sealing means are provided around each of the stages for providing a seal between outer peripheral portions of the stages and the inner peripheral surface of the stage casing, with the sealing means being formed of a material whose coefficient of thermal expansion differs from the coefficient of thermal expansion of the stages and the stage casing.

According to still further features of the present invention there is provided a multi-stage diffuser-type centrifugal pump comprising a stage casing, a rotary shaft provided in the stage casing, and driving means for driving the rotary shaft, and impellers provided on the rotary shaft in a plurality of stages. The stages are respectively disposed between adjacent ones of the impellers to form a channel of flow from an upstream-side impeller to a downstream-side impeller between the stage and an inner peripheral surface of the stage casing, with each of the stages being including a diffuser vane and a return vane which are formed integrally, and flat plates being respectively provided between adjacent ones of the stages, as well as sealing means interposed between each of the flat plate and the stage casing to provide a seal therebetween.

According to still further features of the present invention there is provided a multi-stage diffuser-type centrifugal pump comprising a suction pot, a stage casing disposed inside the suction pot, a rotary shaft provided in the stage casing, driving means for driving the rotary shaft, and impellers provided on the rotary shaft in a plurality of stages. The stages are respectively disposed between adjacent ones of the impellers to form a flow channel between the same and an inner peripheral surface of the stage casing, with each of the stages including a diffuser vane, a return vane, and a flat plate. Piston rings are provided and are respectively adapted to provide a seal between an outer peripheral portion of the stage and an inner peripheral portion of the stage casing and between adjacent ones of the stages, with each of the piston rings having cut ends and being formed of a material having a coefficient of thermal expansion which differs from the coefficient of thermal expansion of the stage and stage casing.

According to yet additional features of the present invention there is provided a piston ring for use in a multi-stage diffuser-type centrifugal pump having impellers provided on the rotary shaft in a plurality of stages, with the stages being respectively disposed between adjacent ones of the impellers to form a flow channel between the same and an inner peripheral surface of the stage casing. A piston ring, adapted to provide a seal between an outer peripheral portion of each of the stages and an inner peripheral portion of the stage casing, is provided with cut ends, and is formed of a material having a coefficient of thermal expansion which differs from the coefficient of thermal expansion of the stage and the stage casing.

In accordance with the present invention, the stage casing is disposed at a portion corresponding to the outer barrel of the stage, and a seal is provided between the outer peripheral portion of each stage and the inner peripheral portion of the stage casing by sealing means such as a piston ring. Accordingly, tightening bolts provided for the outer peripheral portion of each stage can be dispensed with, and the suction casing which previously had a large outside diameter can be made compact. Hence, the pump can also be made compact, and, since the tightening bolts whose handling has been troublesome can be eliminated, disassembly and assembly can be effected simply and maintenance characteristics of the pump can be improved.

In addition, in accordance with the present invention, since the sealing means such as the piston ring can be fabricated by using a material whose coefficient of thermal expansion differs from those of the stage and the stage casing, it is possible to fabricate the stage and the stage casing with a material having high strength or with the same material. Accordingly, it is possible to provide a multi-stage diffuser-type centrifugal pump which is easy to fabricate and is provided with high strength.

The above and other objects, features and advantages of the present invention will become more apparent from the following detailed description of the invention when read in conjunction with the accompanying drawings.

BRIEF DESCRIPTION OF THE DRAWINGS

The drawings illustrate an embodiment of a multi-stage diffuser-type centrifugal pump in accordance with the present invention, wherein.

DETAILED DESCRIPTION OF THE PREFERRED EMBODIMENT

Figure 1:
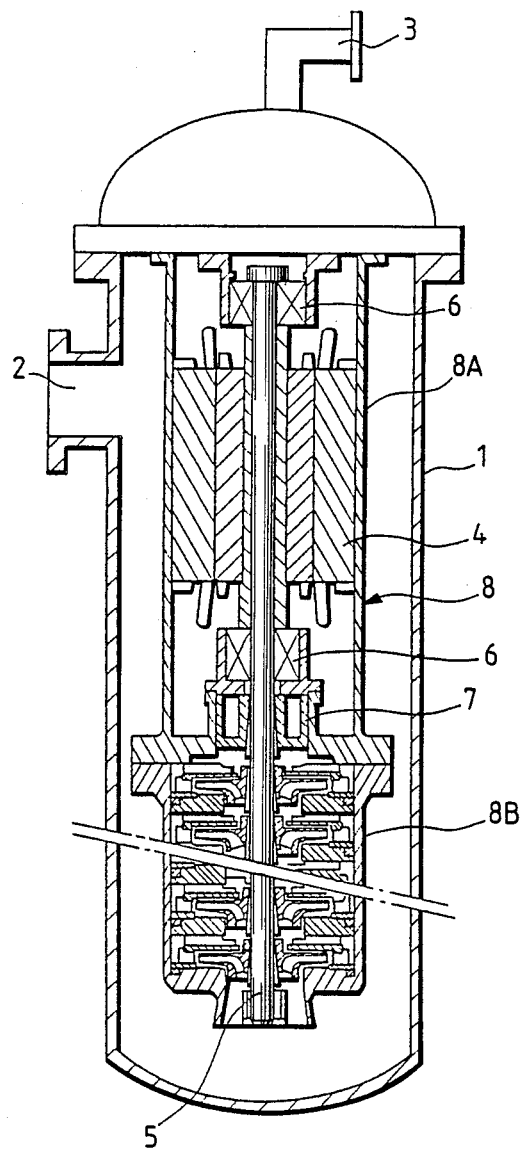
FIG. 1 is a vertical cross-sectional view of the pump constructed in accordance with the present invention.
Figure 2:
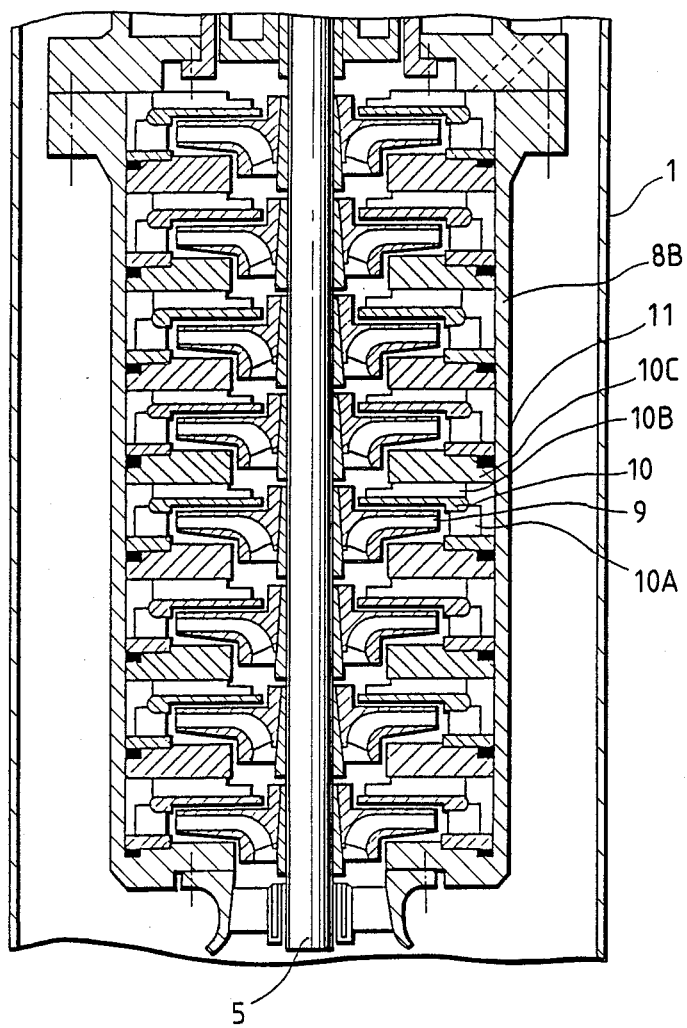
FIG. 2 is an enlarged cross-sectional view of a portion of the pump of FIG. 1.

Referring now to the drawings where in like reference numerals are used throughout the various view to designate like parts and, more particularly, to FIGS. 1 and 2, according to these figures, a suction pot 1 has a suction pipe 2 and a discharge pipe 3, with a driving portion or driving means for such, for example, a motor, being provided and being adapted rotatively drive a rotary shaft 5. A bearing 6 supports the rotary shaft 5, and a balanced disk 7 is fitted therein to achieve a rotation balance of the rotary shaft 5. A stage casing generally designated by the reference numeral 8 is split into an upper stage casing 8A and a lower stage casing 8B, which are secured by bolts (not shown). The upper stage casing 8A is secured to the suction pot 1 by bolts (not shown), and an impeller 9 is secured to the rotary shaft 5.

As shown most clearly in FIG. 2, a stage 10 has an integral structure comprising a diffuser vane 10A, a return 10B, and a flat plate 10C, with a plurality of such stages being superposed on each other and inserted in the lower stage casing 8B. Each of the stages 10 is arranged such that no outer barrel section of the stage 10 is provided and a flow channel is formed on an inner surface of the stage casing 8B. Although the diffuser and the stage 10 have conventionally been formed by being split into two, they are arranged to be capable of being cast integrally in accordance with the present invention.

Although the present invention attempts to improve reliability by reducing the number of parts used and a simplified structure by integrating its structure, the vanes 10A, 10B and flat plate 10C may be split and formed as separate parts. A piston ring 11 serves as a sealing means for providing a seal between adjacent ones of the stages 10 and between an outer peripheral portion of each of these stages and an inner peripheral portion of the lower stage casing 8B.

Figure 3:
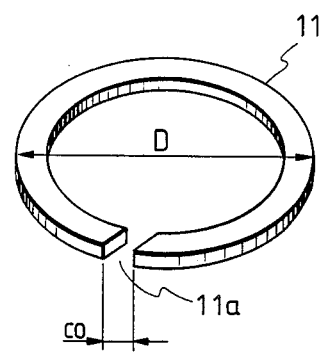
FIG. 3 is a perspective view of a piston ring shown in FIG. 2.

As shown in FIG. 3, the piston ring 11 has cut ends 11a and is capable of reducing its outside diameter D through the application of a small force. To assemble the pump, the stages and the impellers are superposed on each other, and are then inserted into the lower stage casing 8B. At the time of insertion, the outside diameter D of the piston ring 11 is slightly greater than the inside diameter of the lower stage casing 8B, so that the outside diameter D of the piston ring 11 is compressed up to the inside diameter of the lower stage casing 8B, and these superposed members are inserted by being slid along the inner periphery of the stage casing 8B. If continuous annular sealants such as, for example, O rings are used, a substantial force is required in the insertion of the superposed members at the time of assembly. In the case of a large pump, a large press or the like is required for insertion at the time of assembly. Accordingly, a C-shaped piston ring, i.e. a piston ring of the type provided with a radial cut, which requires only a small inserting force, is most suitable as the sealing means which is fit around the outer periphery of the stage 10.

Figure 5:
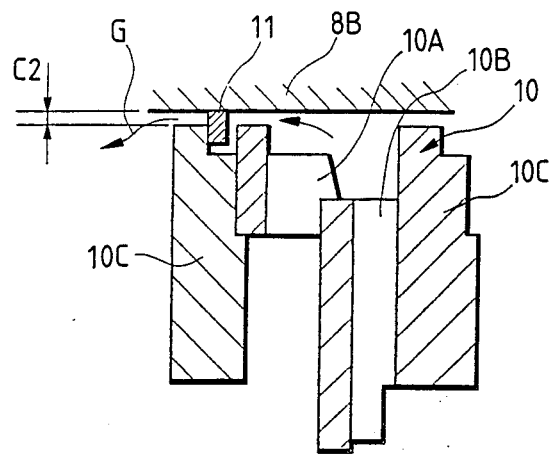
FIGS. 5 and 6 are partial cross-sectional views illustrating installation of the piston according to still another example thereof.
Figure 6:
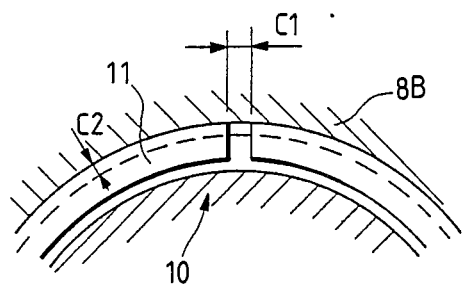

As shown in FIG. 5, the piston ring 11 is installed with its outer peripheral portion brought into close contact with the inner peripheral portion of the lower stage casing 8B. A gap C1 (FIG. 6) between the cut ends 11a of the piston ring 11 when it is installed is smaller than its gap in a free state (a state before it is inserted in the lower stage casing), and yet the former gap is smaller by only several millimeters. The liquid supplied by the pump under pump leaks through this opening (area: C1×C2) in the direction of the arrow G, but since the gap C2 (FIG. 5) is only about 0.01 to 0.1 mm, the area of the opening is very small and the amount of leak is also very small. Accordingly, the effect of this leak reducing the efficiency of the pump can be set to an amount of a negligible level. In addition, in this embodiment, no step is provided in an intermediate portion of the inner periphery of the lower stage casing 8B, and only the lowermost portion of the stage 10 is restricted in the axial direction. It is conceivable to provide steps on the inner peripheral portion of the lower stage casing 8B.

By virtue of the features of the present invention, it is possible to eleminate a plurality of large-diameter and elongated tightening bolts, so that the pump and the suction pot for accommodating the pump can be made compact. Moreover, since the heavy-weight tightening bolts can be eliminated and flanges of the suction pot and the motor casing to which the tightening bolts are conventionally fixed can be made compact, it is possible to make the pump light weight. Additionally, since the tightening bolts which require experience and skill in tightening and a large number of fabrication and assembly processes can be eliminated and piston rings excelling in sealing characteristics are used, the amount of leakage is small during operation of the pump. Furthermore, since only a small inserting force is required, it is possible to provide a pump which facilitates assembly and disassembly and which excels in maintenance efficiency.

Figure 4:
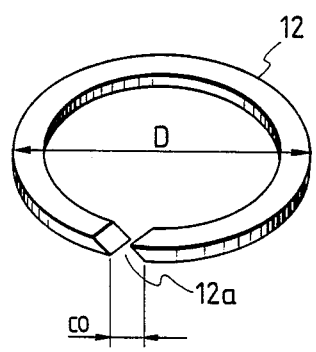
FIG. 4 is a perspective view of another example of a piston ring.

The piston ring 12 shown in FIG. 4 is arranged such that its cut ends 12a are formed by inclined surfaces, but the piston ring 12 has an advantage similar to that of the piston ring 11 shown in FIG. 3.

If the above-described piston ring (sealing means) is formed by a material whose coefficient of thermal expansion differs from that of the stage 10 and the stage casing 8, the assembly and disassembly can be facilitated remarkably, and the sealing performance can be improved. In other words, it is preferred that, in the case of a pump for handling a low-temperature liquid, the piston ring having cut ends is formed of a material having a smaller coefficient of thermal expansion, while, in the case of a pump for handling a high-temperature liquid, the piston ring is formed of a material having a greater coefficient of thermal expansion. A more detailed description of this aspect will be given here and below.

Figure 7:
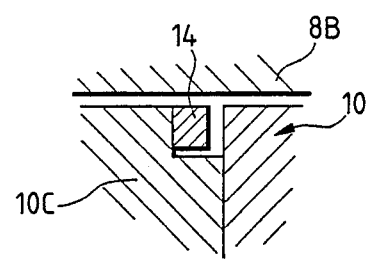
FIG. 7 is a partial cross-sectional view; illustrating the operation of a further example of the piston ring, during installation

In the pump for feeding a low-temperature liquid under pressure, at the time of assembling of the pump, the outside diameter of a piston ring 14 shown in FIG. 7 is made smaller than the inside diameter of the lower stage casing 8B so as to facilitate the assembly. A material having a smaller coefficient of thermal expansion than the coefficient of thermal expansion of the stage 10 and the lower stage casing 8B is used for the piston ring 14.

Figure 8:
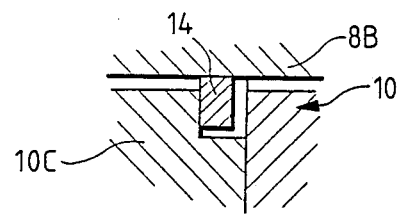
FIG. 8 is a partial cross-sectional view illustrating the piston ring of FIG. 7 during operation diagram thereof during operation.

In this arrangement, if the pump is installed in a low-temperature liquid such a liquefied gas, the stages 10, the lower stage casing 8B, and the piston rings 14 are cooled. Since the coefficient of thermal expansion of the piston ring 14 is smaller than the coefficient of thermal expansion of the other components, the amount of shrinkage of the piston ring 14 is smaller and the diameter of the piston ring 14 is relatively expanded as compared with those of the stages 10 and the lower stage casing 8B. As a result, the piston ring 14 is brought into close contact with the lower stage casing 8B and becomes capable of sealing, as shown in FIG. 8. As an example of the combination of materials, the stages 10 and the lower stage casing 8B are formed of an aluminum alloy ( a coefficient of thermal expansion: $20\times10^{-6}$ mm/mm°C.), and the piston ring 14 is formed of martensitic stainless steel (a coefficient of thermal expansion: $10\times10^{-6}$ mm/mm°C.). In this case, if it is assumed that the outside diameter $\Delta D$ is 500 mm, the temperature of the liquid handled is 180° C., and the ambient temperature at the time of assembling of the pump is 20° C., a difference $\Delta D$ in displacement of the outside diameter between the two materials can be expressed as:
$\Delta D = (20-10) \times 10^{-6} \times 500 \times \{20-(-180)\} = 1$ mm.
Accordingly, in this case, if a gap of 0.5 mm is provided in advance between the lower stage casing 8B and the piston ring 14, a compressive force of 0.5 mm can be provided to the piston ring 14 during the operation of the pump, so that the piston ring 14 and the lower stage casing 8B can be brought into close contact with each other, thereby making it possible to effect sealing.

If the above-described arrangement is adopted, the following advantage can be obtained in addition to those mentioned above.

Namely, the arrangement is such that the coefficient of thermal expansion of the piston rings is made smaller than the coefficient of thermal expansion of the stage casing and the like, the outside diameter of the piston rings is made such as to be smaller than the inside diameter of the stage casing at an ordinary temperature (i.e., at the time of assembly), so that at a low-temperature (i.e., during operation of the pump) the piston rings 14 can be brought into contact with the lower stage casing 8B. Therefore, the frictional resistance occurring at the time of inserting the stage section into the stage casing 8B during assembly can be reduced to virtually nothing, so that the assembling efficiency can be improved remarkably.

In the case of a pump for handling a high-temperature liquid, if, to the contrary, a material having a greater coefficient of thermal expansion is used for the piston ring 14, an advantage similar to that described above can be obtained.

Figure 9:
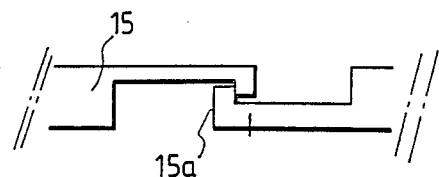
FIGS. 9 and 10 are schematic views of a still further example of a piston ring.
Figure 10:
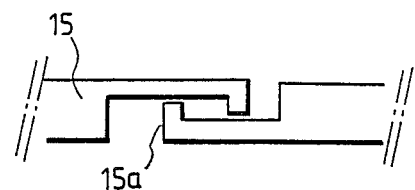

As for the cut end portions of the piston ring, the ones shown in FIGS. 3 or 4 may be used, and hook-shaped ones shown in FIGS. 9 and 10 may also be used effectively. These drawings show cut end portions 15a as viewed in the direction of the outer periphery of a piston ring 15. In the case of this piston ring 15, in the same way as the above-described piston ring 14, the coefficient of thermal expansion of the piston ring 15 is made smaller than the coefficient of thermal expansion of the lower stage casing 8B, and at the time of assembly at normal temperature the piston ring 15 is compressed with an appropriate pressure and is fixed as shown in FIG. 9, and its outside diameter D is made smaller than the inside diameter of the lower stage casing 8B. When the temperature becomes low during operation, the cut ends undergo displacement, as shown in FIG. 10, and the its diameter becomes slightly smaller. However, since the amount is shrinkage of the lower stage casing 8B is larger than that of the piston ring 15, the piston ring 15 is compressed from the outside. In this case, not only the pressure resulting from a difference in the amount of shrinkage due to the difference in the coefficient of thermal expansion but also the pressure derived from the compression at the time of assembly is also applied as the contacting pressure between the piston ring 15 and the lower stage casing 8B. Thus, since the cut end portions 15a are formed into a hook shape, the cut end portions 15a also serve as a holding means for holding the compressive force in the piston ring 15 in advance.

For instance, it is presumed that, at the time of assembly at ordinary temperature, a compressive force is applied to the piston ring 15 to allow the hooked portions thereof to engage with each other in such a manner that the outside diameter of the piston ring 15 becomes 10 mm smaller. If it is presumed that a difference in elongation between the stage casing 8B and the piston ring 15 at low temperature is 1 mm, and a gap between the inner periphery of the stage casing 8B and the outer periphery of the piston ring 15 is 0.5 mm, then, the force applied to the piston ring 15 at low temperature becomes a compressive force that reduces the diameter of the piston ring 15 by 10.5 mm.

Accordingly, if this piston ring 15 is used, it is possible to obtain the same advantage obtained with the piston ring 11, 12 or 14. Additionally, it is possible to obtain further advantages. More particularly, it is possible to arbitrarily set the contacting pressure between the piston ring and the stage casing, and the sealing performance can therefore be further improved. Moreover, since the gap between the cut ends can be reduced to nothing, it is possible to reduce the leakage of the liquid from the pump to nothing, thereby improving the sealing performance.

As described above, in accordance with the present invention, there is an advantage in that the outside diameter of the pump and the outside diameter of the suction pot can be reduced, and the pump and the suction pot can be made lightweight. Furthermore, it is possible to provide a multi-stage diffuser-type centrifugal pump which facilitates fabrication, assembly and disassembly thereof, excels in maintenance characteristics and has high strength.

What is claimed is:

1. A multi-stage diffuser-type centrifugal pump comprising:
   a stage casing;
   a rotary shaft provided in said stage casing;
   driving means for driving said rotary shaft;
   impellers provided on said rotary shaft in a plurality of stages, said stages being respectively disposed between adjacent ones of said impellers to form a flow channel between the same and an inner peripheral surface of said stage casings; and
   sealing means provided around each of said stages for providing a seal between outer peripheral portions of said stages and said inner peripheral surface of said stage casing, said sealing means being formed of a material having a coefficient of thermal expansion which differs from a coefficient of thermal expansion of said stages and said stage casing such that when the centrifugal pump is at a normal temperature, a clearance is formed between said inner peripheral surface of said stage casing and an outer peripheral surface of said sealing means, and when the pump is at an operating temperature, the sealing means closely contacts said inner peripheral surface of said stage casing by virtue of the difference in the coefficient of thermal expansion between said sealing means and said stage casing.

2. A multi-stage diffuser-type centrifugal pump according to claim 1, wherein each of said stages comprises a diffuser vane, a return vane and a flat plate which are formed integrally.

3. A multi-stage diffuser-type centrifugal pump according to claim 1, further comprising sealing means for providing a seal between adjacent ones of said stages.

4. A multi-stage diffuser-type centrifugal pump according to claim 3, wherein said sealing means for providing a seal between each of said stages and said stage casing and said sealing means for providing a seal between adjacent ones of said stages are formed by one sealing means.

5. A multi-stage diffuser-type centrifugal pump according to claim 1, wherein said sealing means is formed by a piston ring having cut ends.

6. A multi-stage diffuser-type centrifugal pump according to claim 5, wherein said piston ring having said cut ends is provided with holding means for holding a compressive force in advance.

7. A multi-stage diffuser-type centrifugal pump according to claim 1, wherein said pump is adapted to handle a high-temperature liquid, and said sealing means is formed of a material having a coefficient of thermal expansion which is greater than a coefficient of thermal expansion of said stages and said stage casing.

8. A multi-stage diffuser-type centrifugal pump said pump being adapted to forcibly transmit a low-temperature fluid comprising:
   a stage casing;
   a rotary shaft provided in said stage casing;
   driving means for driving said rotary shaft;
   impellers provided on said rotary shaft in a plurality of stages, said stages being respectively disposed between adjacent ones of said impellers to form a flow channel between the same and an inner peripheral surface of said stage casing; and
   sealing means provided around each of said stages for providing a seal between outer peripheral portions of said stages and said inner peripheral surface of said stage casings, said sealing means is formed of a material having a coefficient of thermal expansion which is smaller than a coefficient of thermal expansion of said stages and said stage casing, such that when the centrifugal pump is at a normal temperature, a clearance is formed between said inner peripheral surface of said stage casing and an outer peripheral surface of said sealing means, and when the pump is at an operating temperature, the sealing means closely contacts said inner peripheral surface of said stage casing by virtue of the difference in the coefficient of thermal expansion between said sealing means and said stage casing.

9. A multi-stage diffuser-type centrifugal pump comprising:
   a suction pot;
   a cylindrical barrel-shaped stage casing disposed inside said suction pot to form a flow channel;
   a rotary shaft provided in said stage casing;
   driving means for driving said rotary shaft;
   impellers provided on said rotary shaft in a plurality of stages, said stages respectively disposed between adjacent ones of said impellers to form the channel of flow from an upstream-side impeller to a downstream-side impeller between the same and an inner peripheral surface of said cylindrical barrel-shaped stage casing; and
   sealing means provided around each of said stages for providing a seal between outer peripheral portions of said stages and said inner peripheral surface of said cylindrical barrel-shaped stage casing, said sealing means being formed of a material having a coefficient of thermal expansion which differs from a coefficient of thermal expansion of said stages and said cylindrical barrel-shaped stage casing, such that when the centrifugal pump is at a normal temperature, a clearance is formed between said inner peripheral surface of said stage casing and an outer peripheral surface of said sealing means, and when the pump is at an operating temperature, the sealing means closely contacts said inner peripheral surface of said stage casing by virtue of the difference in the coefficient of thermal expansion between said sealing means and said stage casing.

10. A multi-stage diffuser-type centrifugal pump according to claim 9, wherein said sealing means is formed by a piston ring.

11. A multi-stage diffuser-type centrifugal pump according to claim 9, wherein each of said stages comprises a diffuser vane, a return vane and a flat plate which are formed integrally.

12. A multi-stage diffuser-type centrifugal pump comprising:
   a cylindrical barrel-shaped stage casing;
   a rotary shaft provided in said stage casing;
   driving means for driving said rotary shaft;
   impellers provided on said rotary shaft in a plurality of stages, said stages respectively disposed between adjacent ones of said impellers to form a channel of flow from an upstream-side impeller between said stage and an inner peripheral surface of said cylindrical barrel-shaped stage casing, each of said stages being formed by a diffuser vane and a return vane which are formed integrally;
   flat plates respectively provided between adjacent ones of said stages; and
   sealing means interposed between each of said flat plates and said cylindrical barrel-shaped stage casing to provide a seal therebetween, such that when the centrifugal pump is at a normal temperature, a clearance is formed between said inner peripheral surface of said stage casing and an outer peripheral surface of said sealing means, and when the pump is at an operating temperature, the sealing means closely contacts said inner peripheral surface of said stage casing by virtue of the difference in the coefficient of thermal expansion between said sealing means and said stage casing.

13. A multi-stage diffuser-type centrifugal pump according to claim 12, wherein said sealing means is formed by a piston ring for forming a seal between said flat plate and said stage.

14. A multi-stage diffuser-type centrifugal pump according to claim 13, wherein said piston ring is formed of a material having a coefficient of thermal expansion which differs from a coefficient of thermal expansion of said stage and said stage casing.

15. A multi-stage diffuser-type centrifugal pump according to claim 14, wherein said piston ring includes cut ends and is provided with holding means for holding a compressive force in advance.

16. A multi-stage diffuser-type centrifugal pump comprising:
   a suction pot;
   a cylindrical barrel-shaped stage casing disposed inside said suction pot;
   a rotary shaft provided in said stage casing;
   driving means for driving said rotary shaft;
   impellers provided on said rotary shaft in a plurality of stages, said stages respectively disposed between adjacent ones of said impellers to form a flow channel between the same and an inner peripheral surface of said stage casing, each of said stages including a diffuser vane, a return vane, and a flat plate; and
   piston rings respectively adapted to provide a seal between an outer peripheral portion of said stages and inner peripheral portion of said stage casing and between adjacent ones of said stages, each of said piston rings have cut ends and are formed of a material having a coefficient of thermal expansion which differs from a coefficient of thermal expansion of said stage and said stage casing such that when the centrifugal pump is in a normal temperature stage, a clearance is formed between said inner peripheral surface of said stage casing and outer peripheral surface of the piston ring and when the centrifugal pump is at an operating temperature, the piston ring closely contacts said inner peripheral surface of said cylindrical-barrel shaped stage casing by virtue of the difference in the coefficient of thermal expansion between the piston rings and the cylindrical barrel-shaped stage casing.

17. A multi-stage diffuser-type centrifugal pump according to claim 16, wherein when said pump handles a low-temperature liquid, each of said piston rings having said cut ends is formed of a material having a coefficient of thermal expansion which is smaller than a coefficient of thermal expansion of said stage and said casing, and when said pump handles a high-temperature liquid, each of said piston rings having said cut ends is formed of a material having a coefficient of thermal expansion which is greater than a coefficient of thermal expansion of said stage and said stage casing.

* * * * *